United States Patent [19]

Meekel et al.

[11] Patent Number: 5,693,263

[45] Date of Patent: Dec. 2, 1997

[54] A SPARGER FOR PRODUCING GAS BUBBLES IN A LIQUID

[75] Inventors: William A. C. Meekel, Kamloops; Harold E. Wyslouzil, Delta, both of Canada

[73] Assignee: Cominco Engineering Services Ltd., Vancouver, Canada

[21] Appl. No.: 485,378

[22] Filed: Jun. 7, 1995

Related U.S. Application Data

[62] Division of Ser. No. 429,746, Apr. 26, 1995, Pat. No. 5,645,459.

[51] Int. Cl.$^6$ .................... B01F 3/04; C02F 1/24; B01D 17/035
[52] U.S. Cl. .................... 261/64.3; 261/65; 261/121.1; 261/121.4; 210/221.2; 210/703
[58] Field of Search .................... 261/64.3, 65, 121.1, 261/121.4; 209/170; 210/221.2, 703

[56] References Cited

U.S. PATENT DOCUMENTS

| | | |
|---|---|---|
| 695,232 | 3/1902 | Reynolds . |
| 1,283,993 | 11/1918 | Wallace et al. . |
| 1,285,493 | 11/1918 | Wallace . |
| 1,338,592 | 4/1920 | Sanford . |
| 1,713,787 | 5/1929 | Stinson . |
| 1,727,295 | 9/1929 | Lynch . |
| 1,783,646 | 12/1930 | Hajek . |
| 1,860,450 | 5/1932 | Campbell . |
| 1,885,000 | 10/1932 | Muller . |
| 1,895,047 | 1/1933 | Neumann . |
| 1,933,611 | 11/1933 | White . |
| 1,985,770 | 12/1934 | Edwards . |
| 2,043,798 | 6/1936 | Hyatt . |
| 2,618,290 | 11/1952 | Van Vliet . |
| 4,290,979 | 9/1981 | Sugiura . |
| 4,518,543 | 5/1985 | Dorsch . |
| 4,534,914 | 8/1985 | Takahashi . |
| 4,708,827 | 11/1987 | McMillin . |

(List continued on next page.)

FOREIGN PATENT DOCUMENTS

| | | |
|---|---|---|
| 88136 | 9/1983 | European Pat. Off. . |
| 673327 | 1/1930 | France . |

OTHER PUBLICATIONS

Article entitled "Fat Removal from Process Waters Of The Fish Meal Industry, A Study of Three Flotation Methods" by Marti et al. Environmental Technology, vol. 15, pp. 29–39 (1994).

Article entitled "Oil Recovery from Oil in Water Emulsions Using a Flotation Column" by Rajinder et al; The Canadian Journal of Chemical Engineering, vol. 68, pp. 959–967 (1990).

Article entitled "Flow Characterization of a Flotation Column" by Rajinder et al; The Canadian Journal of Chemical Engineering, vol. 67, pp. 916–923 (1989).

Article entitled "Removal of oil and grease from industrial wastewaters" by Ford et al; Chemical Engineering/Deskbook Issue, Oct. 17, 1977, pp. 49–56.

Publication entitled "Advanced Gas/Liquid Contacting Technology Engineering Guide" published by Mott Metallurgical Corporation prior to 1985.

*Primary Examiner*—Thomas M. Lithgow
*Attorney, Agent, or Firm*—Elbie R. de Kock

[57] ABSTRACT

A sparger (100) for producing gas bubbles in a liquid comprises a body member (102) having a gas inlet (105) and an outlet portion (106) provided with a gas outlet (108). The outlet portion (106) has an internal bore (110) which is in communication with the gas inlet (105) and the gas outlet (108). The bore (110) has opposite sides which converge in the direction of the outlet (108) to form a tapered region (112) in the bore (110). The bore (110) has a substantially constant diameter along at least a part of its length in an area between the tapered region (112) and the outlet (108). The sparger (100) further comprises a valve member (114) which is moveable into said tapered region (112) towards the outlet (108) for controlling the flow of gas through the outlet (108).

5 Claims, 7 Drawing Sheets

U.S. PATENT DOCUMENTS

| | | |
|---|---|---|
| 4,855,088 | 8/1989 | Sohn . |
| 4,874,534 | 10/1989 | Sorensen et al. . |
| 5,080,802 | 1/1992 | Cairo, Jr. et al. . |
| 5,100,546 | 3/1992 | Broussard, Sr. . |
| 5,156,745 | 10/1992 | Cario, Jr. et al. . |
| 5,158,678 | 10/1992 | Broussard, Sr. . |
| 5,294,003 | 3/1994 | Hollingsworth . |
| 5,300,222 | 4/1994 | Broussard, Sr. . |
| 5,307,937 | 5/1994 | Hutwelker . |
| 5,332,100 | 7/1994 | Jameson . |
| 5,335,785 | 8/1994 | Kawatra et al. . |
| 5,340,469 | 8/1994 | Montgomery . |

A SPARGER FOR PRODUCING GAS BUBBLES IN A LIQUID

CROSS REFERENCE TO RELATED APPLICATION

This application is a division of United States patent application Ser. No. 08/429,746 filed Apr. 26, 1995, (now U.S. Pat. No. 5,643,459) the entire contents of which is incorporated herein by reference.

FIELD OF THE INVENTION

This invention relates to a flotation method and apparatus, which, in particular, but not exclusively, are suitable for use in the oil industry to remove oil, as well as solids, from water, such as the waste water streams produced by the industry, before reusing or discharging the water to the environment.

BACKGROUND OF THE INVENTION

Oil and gas producing wells and oil refineries produce waste water streams that contain about 500 ppm or more residual water insoluble oil. In the oil industry, flotation is used to remove oil from waste water streams. Flotation involves contacting the oil droplets with gas bubbles. Due to the hydrophobic nature of oil, oil will attach itself to the gas bubbles which are rising through the oily water. The gas bubbles with oil attached rise to the top of the water. The gas is released, leaving the oil on top of the water, from where the oil is removed.

Conventional flotation equipment for the separation of oil from water comprise horizontal tanks provided with mechanical equipment to induce gas. This equipment produces an oily product containing about 3 to 5% oil with the balance being water. This product requires further treatment, e.g. by means of a gravity separator or a cyclone, to obtain a purer oil product. In addition, the treated water produced by the conventional mechanical flotation processes still contains trace amounts of oil which in some instances do not meet the stringent requirements prescribed by modern environmental legislation.

Although oil removal is the main problem, solids present in the water can be a serious problem as well. For example, if hydrogen sulphide gas ($H_2S$) is present in the water, FeS forms which is a fine black precipitate that is difficult to remove. The amount of precipitate varies with conditions but in some cases large quantities can form so that the water will be black even if all the oil has been removed. In addition, other precipitates can also form, such as calcium sulphate ($CaSO_4$), calcium or magnesium carbonate ($CaCO_3$, $MgCO_3$) and barium sulphate ($BaSO_4$). If these solids are present, they can cause disposal problems and can detrimentally affect the appearance of the water. The solids are normally very fine, typically less than 10 microns, because they are precipitates, and are difficult to remove.

It is accordingly an object of the present invention to provide a flotation process for the treatment of oil contaminated water which produces a purer treated water product which can be discharged directly to the environment, if required, and an oil product which has significantly less water than the oily product produced by the conventional flotation methods.

SUMMARY OF THE INVENTION

According to the invention, there is provided a method of removing finely divided bodies of an insoluble substance dispersed in an aqueous medium from said medium, comprising the steps of causing the aqueous medium to flow upwardly in a column at a velocity in the range of from about 0.15 to about 2.5 inch/second (0.05 to 1 cm/second); generating gas bubbles of a substantially uniform size of less than about 0.005 inches (0.1 mm) at the bottom of the column; causing the gas bubbles to rise up in the column in co-current fashion with the flow of said aqueous medium at a velocity in the range of from about 0.025 to about 2.5 inches/second (0.01 to 1 cm/second) in order to contact said bodies of insoluble substance and to capture said bodies and raise them to the surface of the aqueous medium in the column to form a layer of said insoluble substance on the surface of the aqueous medium.

Also according to the invention, there is provided a method of removing finely divided bodies of an insoluble substance dispersed in an aqueous medium, from said medium, comprising the steps of causing said aqueous medium to flow upwardly in a column; generating gas bubbles of a substantially uniform size of less than about 0.005 inches (0.1 mm) at the bottom of the column; causing the gas bubbles to rise up in the column in co-current flow with the flow of said aqueous medium to contact said bodies of insoluble substance and to capture said bodies and raise them to the surface of the aqueous medium in the column to form a layer of said insoluble substance on the surface of the aqueous medium, wherein said aqueous medium is exposed to said co-current flow of said gas bubbles for a period of from about 10 to about 30 minutes.

Further according to the invention, there is provided a method of removing finely divided bodies of an insoluble substance dispersed in an aqueous medium, from said medium, comprising the steps of causing said aqueous medium to flow upwardly in a column; generating gas bubbles of a substantially uniform size of less than about 0.005 inches (0.1 mm) at the bottom of the column; causing the air bubbles to rise up in the column in co-current flow with the flow of said aqueous medium to contact said bodies of insoluble substance and to capture said bodies and raise them to the surface of the aqueous medium in the column to form a layer of said insoluble substance on the surface of the aqueous medium, wherein the ratio of the flow rate of the aqueous medium to the flow rate of the gas bubbles is in the range from about 10 to about 30.

Also according to the invention, there is provided a method of removing finely divided bodies of an insoluble substance dispersed in an aqueous medium, from said medium, comprising the steps of causing said aqueous medium to flow downwardly in a column at a velocity in the range of from about 0.2 to about 1.6 inch/second (0.5 to 4 cm/second); generating gas bubbles of a substantially uniform size in the range of from about 0.004 to about 0.2 inches (0.1 to 5 mm) in diameter at the bottom of the column; causing the gas bubbles to rise up in the column in countercurrent fashion to the flow of said aqueous medium at a velocity in the range of from about 0.04 to about 1.6 inches/second (0.1 to 4 cm/second) in order to contact said bodies of insoluble substance and to capture said bodies and raise them to the surface of the aqueous medium in the column to form a layer of said insoluble substance on the surface of the aqueous medium.

Further according to the invention, there is provided a method of removing finely divided bodies of an insoluble substance dispersed in an aqueous medium, from said medium, comprising the steps of causing said aqueous medium to flow downwardly in a column; generating gas bubbles of a substantially uniform size in the range from about 0.004 to about 0.2 inches (0.1 to 5 mm) in diameter at the bottom of the column; causing the gas bubbles to rise up in the column in countercurrent flow to the flow of said aqueous medium to contact said bodies of insoluble substance and to capture said bodies and raise them to the surface of the aqueous medium in the column to form a layer of said insoluble substance on the surface of the aqueous medium, wherein said aqueous medium is exposed to said countercurrent flow of said gas bubbles for a period of from about 1 to about 15 minutes.

Also according to the invention, there is provided a method of removing finely divided bodies of an insoluble substance dispersed in an aqueous medium, from said medium, comprising the steps of causing said aqueous medium to flow downwardly in a column; generating gas bubbles of a substantially uniform size in the range from about 0.004 to about 0.2 inches (0.1 to 5 mm) in diameter at the bottom of the column; causing the air bubbles to rise up in the column in countercurrent fashion to the flow of said aqueous medium to contact said bodies of insoluble substance and to capture said droplets and raise them to the surface of the aqueous medium in the column to form a layer of said insoluble substance on the surface of the aqueous medium, wherein the ratio of the flow rate of the aqueous medium to the flow rate of the gas bubbles is in the range from about 1 to about 15.

The method may further comprise the steps of maintaining the surface of the aqueous medium in the column at a predetermined level for a predetermined time period; causing the surface of the aqueous medium to rise above said predetermined level at the end of said predetermined time period to discharge at least part of said insoluble substance by overflow from the column; and causing the surface of the aqueous medium to return to said predetermined level.

Further according to the invention, there is provided a method of removing finely divided bodies of an insoluble substance dispersed in an aqueous medium from said medium, comprising the steps of causing the aqueous medium to flow through a column; generating gas bubbles in the column and causing the gas bubbles to rise up in the column in said aqueous medium in order to contact said bodies of insoluble substance and to capture said bodies and raise them to the surface of the aqueous medium in the column to form a layer of said insoluble substance on the surface of the aqueous medium; maintaining the surface of the aqueous medium in the column at a predetermined level for a predetermined time period; causing the surface of the aqueous medium to rise above said predetermined level at the end of said predetermined time period to discharge at least part of said insoluble substance by overflow from the column; and causing the surface of the aqueous medium to return to said predetermined level.

The method according to the invention is preferably carried out at a temperature above room temperature, such as in the range of 100° F.–150° F. (80° C.–130° C.).

Also according to the invention, there is provided flotation apparatus for removing finely divided bodies of an insoluble substance dispersed in an aqueous medium from said medium, comprising a vertical flotation column having a feed inlet for the aqueous medium, an outlet for the aqueous medium spaced from said inlet for the flow of the aqueous medium through the column from said feed inlet to said outlet; a sparging system for generating gas bubbles rising upwardly in the aqueous medium to capture and raise said finely divided bodies of the insoluble substance to the surface of the aqueous medium in the column to form a layer of said insoluble substance on the surface of the aqueous medium; a launder inside the column and extending circumferentially around the inner surface of the column for receiving an overflow of said insoluble substance therein; and an outlet for said insoluble substance in said launder.

The feed inlet may comprise a feed inlet tube extending radially inwardly of said column for receiving said aqueous medium, said feed inlet tube being provided with an upwardly facing discharge opening located in said column and including a deflector plate for deflecting aqueous medium exiting from said discharge opening in directions radially outwardly from said discharge opening. The discharge opening may have an annular shape and the deflector plate may comprise a conical member concentric with the discharge opening.

The column may be divided into a plurality of longitudinal segments by means of baffles extending longitudinally of the column and wherein one said feed inlet is provided in each of said segments, the discharge opening of each said feed inlet being located substantially centrally of the cross section of each said segment.

The sparging system may comprise at least one sparger tube located inside the column; means for connecting said at least one tube to a source of pressurized gas; and means for controlling the pressure in said at least one tube. The sparger tube may comprise a porous metal material with a porosity in the range of about 0.5 to about 10 microns.

The apparatus may further comprise first means for maintaining the surface of the aqueous medium and said layer of insoluble substance at a predetermined level below the launder in the column and second means for intermittently raising the surface of the aqueous medium to rise above said predetermined level to discharge at least part of the insoluble substance in said layer on the surface of the aqueous medium into the launder.

The column may further be provided with an outlet valve for controlling the flow of aqueous medium through said outlet in the column and wherein said first means comprises a level sensor for sensing the level of the surface of the aqueous medium in the column and producing a corresponding level signal and a controller connected to the level sensor for receiving a level signal and operatively connected to said outlet valve for controlling the opening or closing of said outlet valve responsive to a level signal received from said level sensor. The second means may comprise the controller and a timer for timing a predetermined time period, said timer being operatively connected to said controller for activating said controller to initiate closing of said outlet valve to raise the surface of the aqueous medium above said predetermined level to a raised level to effect said discharging of the insoluble substance into the launder and wherein said second means further comprises said level sensor for sensing said raised level for activating said controller to initiate opening of said outlet valve to return the surface of the aqueous medium to said predetermined level.

Also according to the invention, there is provided flotation apparatus for removing finely divided bodies of an insoluble substance dispersed in an aqueous medium from said medium, comprising a vertical flotation column having a feed inlet for the aqueous medium, an outlet for the aqueous medium spaced from said inlet for the flow of the aqueous medium through the column from said feed inlet to said outlet, wherein said feed inlet comprises a feed inlet tube extending radially inwardly of said column for receiving said aqueous medium, said feed inlet tube being provided with an upwardly facing discharge opening located in said column and including a deflector plate for deflecting aqueous medium exiting from said discharge opening in directions radially outwardly from said discharge opening; a sparging system for generating gas bubbles rising upwardly in the aqueous medium to capture and raise said finely divided bodies of the insoluble substance to the surface of the aqueous medium in the column to form a layer of said insoluble substance on the surface of the aqueous medium; and an outlet for said insoluble substance from said column.

Further according to the invention, there is provided flotation apparatus for removing finely divided bodies of an insoluble substance dispersed in an aqueous medium from said medium, comprising a vertical flotation column having a feed inlet for the aqueous medium, an outlet for the aqueous medium spaced from said inlet for the flow of the aqueous medium through the column from said feed inlet to said outlet; a sparging system for generating gas bubbles rising upwardly in the aqueous medium to capture and raise said finely divided bodies of the insoluble substance to the surface of the aqueous medium in the column to form a layer of said insoluble substance on the surface of the aqueous medium; an outlet for said insoluble substance from said column; and first means for maintaining the surface of the aqueous medium and said layer of insoluble substance at a predetermined level below said outlet for insoluble substance from said column and second means for intermittently raising the surface of the aqueous medium to rise above said predetermined level to discharge at least part of said insoluble substance in said layer on the surface of the aqueous medium through said outlet for insoluble substance.

Also according to the invention, there is provided a sparger for producing gas bubbles in a liquid, comprising a body member having a gas inlet and an outlet portion provided with a gas outlet, said outlet portion having an internal bore which is in communication with said gas inlet and gas outlet, said bore having opposite sides which converge in the direction of said outlet to form a tapered region in said bore and including a valve member in association with said tapered region, the valve member being movable relative to said tapered region for controlling the flow of gas through said outlet.

Further according to the invention, there is provided a sparger for producing gas bubbles in a liquid, comprising a body member having a gas inlet and an outlet portion provided with a gas outlet and a gas flow passage between said gas inlet and gas outlet and including a valve member for controlling the flow of gas through said outlet, wherein said valve member is operatively connected to a biasing means responsive to gas pressure in said body member for closing said gas outlet when the gas pressure drops below a predetermined value.

Further objects and advantages of the invention will become apparent from the description of a preferred embodiment of the invention below.

BRIEF DESCRIPTION OF THE DRAWINGS

The invention will now be described, by way of examples, with reference to the accompanying drawings, in which.

DETAILED DESCRIPTION OF PREFERRED EMBODIMENT

Figure 1:
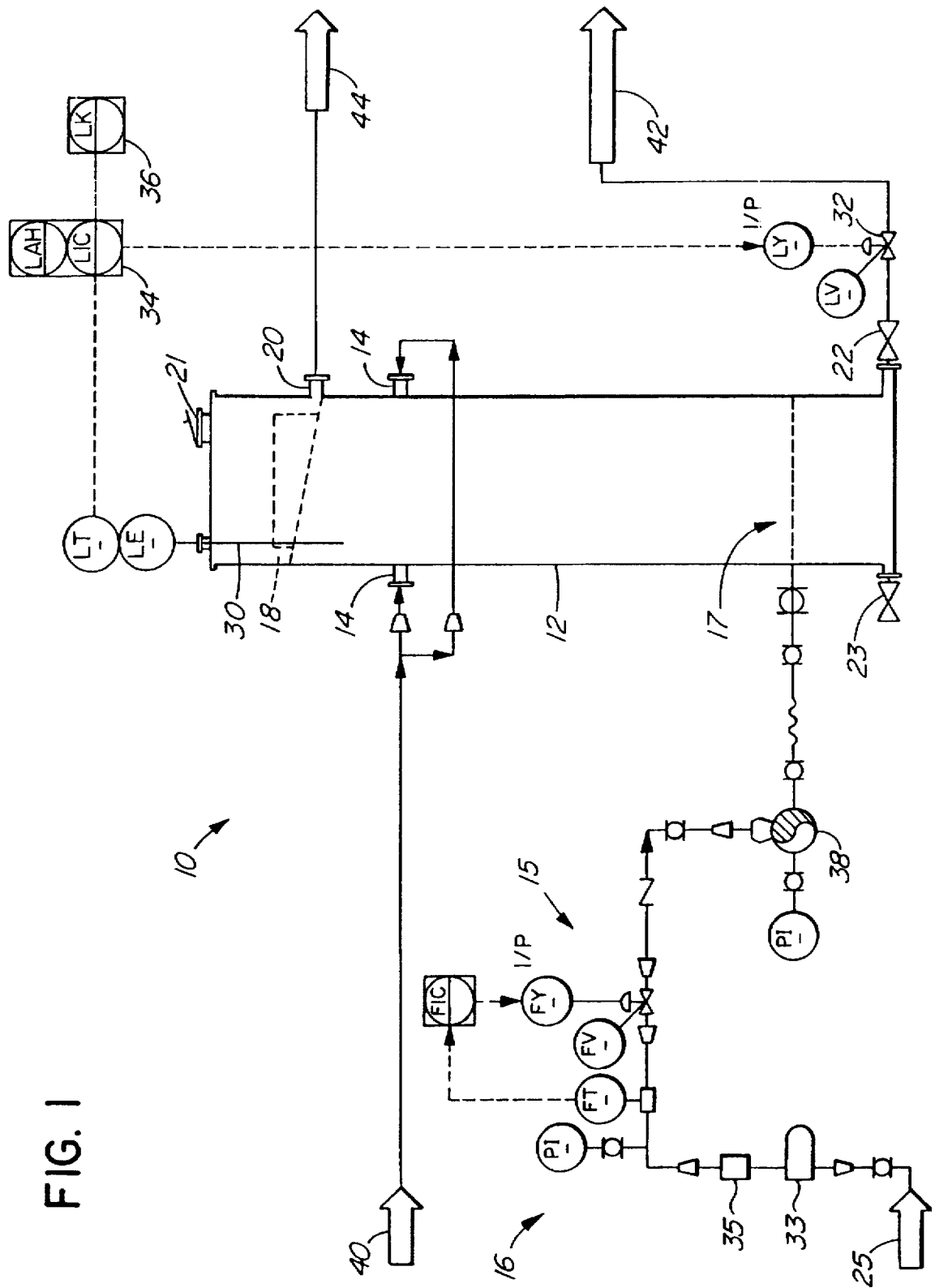
FIG. 1 is a schematical representation of a column flotation system according to the invention.
Figure 2:
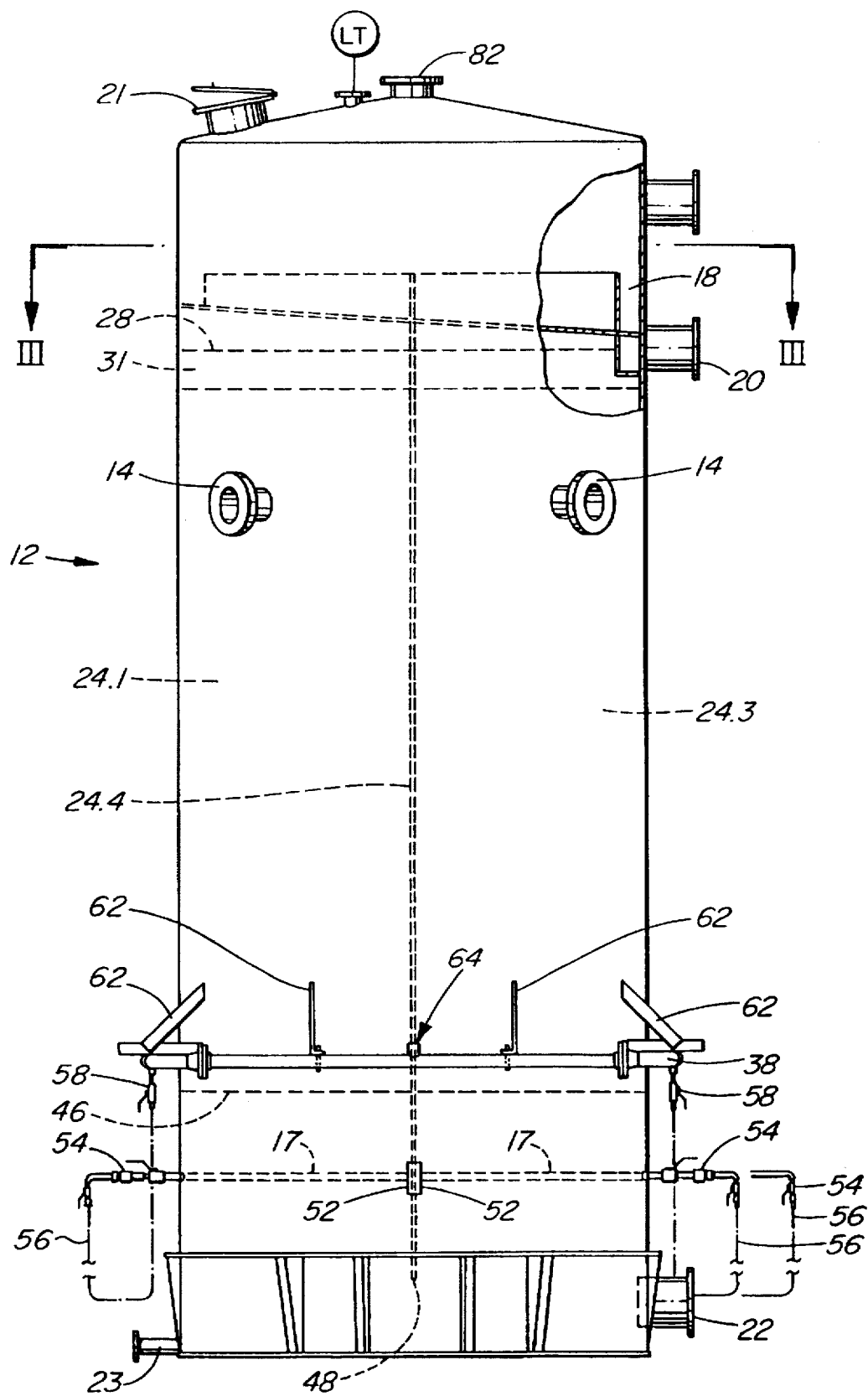
FIG. 2 is a side view, partly broken away, of a flotation column which is suitable for use in the system of FIG. 1, the column being provided with four radially extending baffle plates.

Reference will first be made to the system as shown in general in FIG. 1. In FIG. 1, reference numeral 10 generally indicates a column flotation system according to the invention. The system 10 comprises a flotation column 12 provided with one or more feed inlets 14 (two being shown in the drawing), towards its upper end, a sparging system 16, an annular launder 18 above the feed inlets 14, an oil outlet 20 in the launder 18 and a treated aqueous outlet 22 at the bottom of the column 12. Reference numeral 21 indicates an inspection opening and numeral 23 indicates a drain valve.

The sparging system 16, which will be described in more detail below, comprises a plurality of sparger tubes 17 and a number of components forming a control loop 15 for controlling the gas flow rate to the sparger tubes 17. The control loop 15 can be formed by any suitable method and will not be described further herein. The loop 15 is controllable by an operator for achieving a desired gas flow rate to the sparger tubes 17.

During operation, the sparging system 16 is connected to a source of gas under pressure, as indicated at 25. The gas passes through a filter 33 and a pressure regulator 35 and then through the gas flow control loop 15. From the loop 15 the gas passes to a header pipe 38 from where the gas is distributed to the sparger tubes 17, as will be described below.

While the gas can be air in some applications, e.g., where an organic is separated from an aqueous medium, in the particular application of separating oil from water, a non-oxidizing gas, such as methane (natural gas) is preferred to counteract corrosion. The column 12 may be sealed and provided with a gas off-take at its top for recycling of the gas or for conveying the gas to a gas burning facility.

The feed inlets 14 are connected to a source of oily water to be treated, as indicated at 40. Reference numerals 42 and 44 respectively indicate treated water product and oil product exiting from the system 10.

Figure 3:
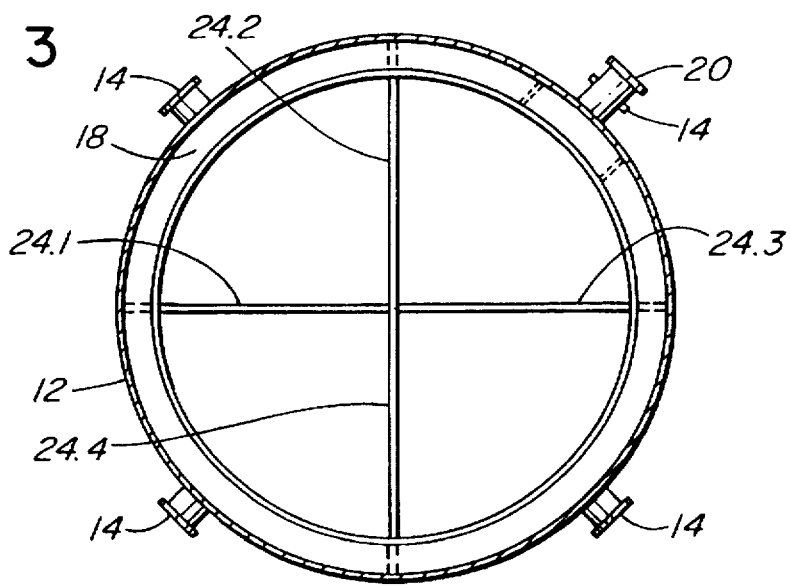
FIG. 3 is a section along the lines III—III in FIG. 2, showing an internal launder of the column.
Figure 4:
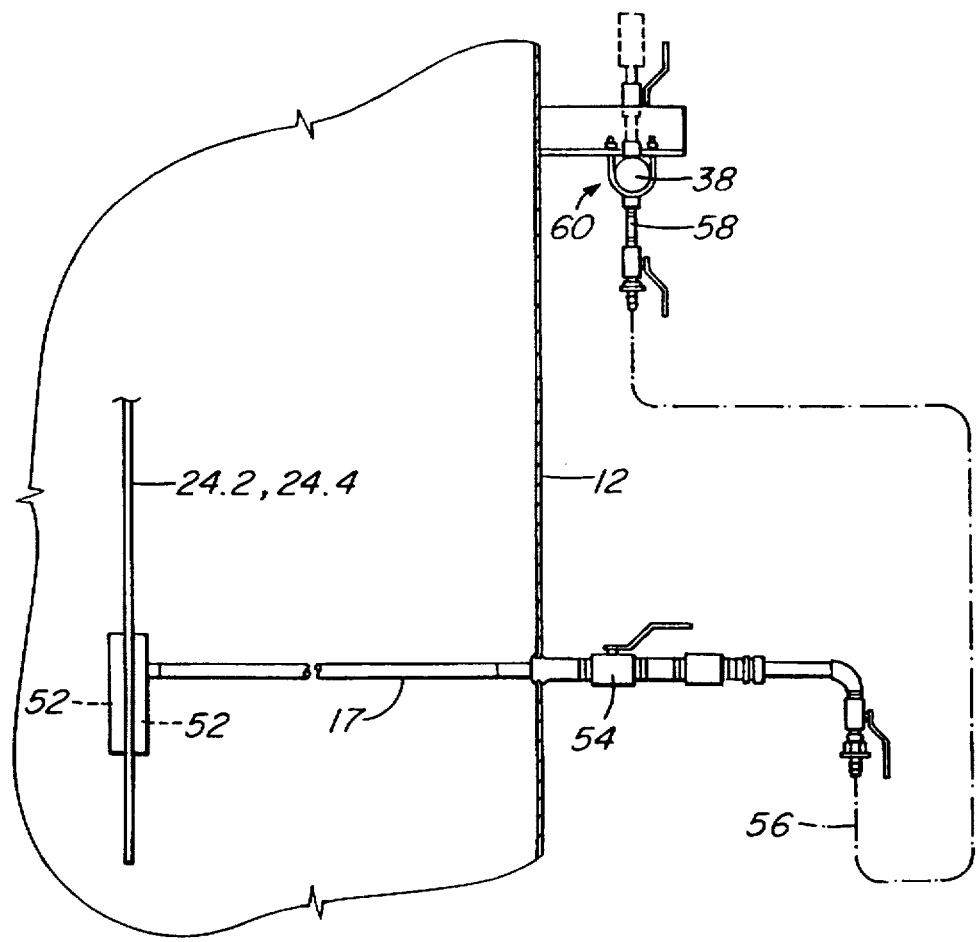
FIG. 4 is a fractional side view showing a sparger tube fitted to a side of the column of FIG. 2.
Figure 5:
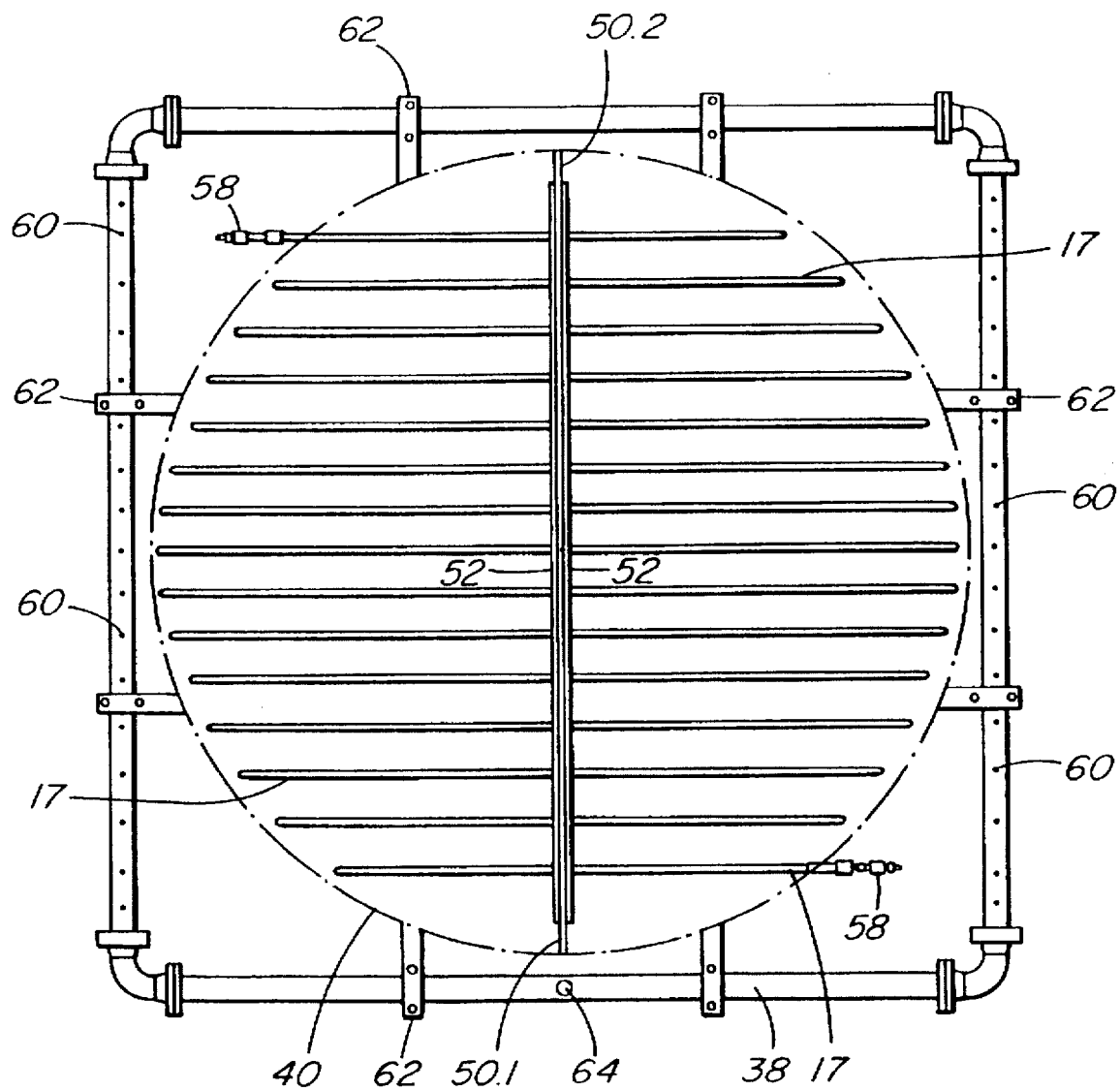
FIG. 5 is a plan view showing an arrangement of sparger tubes in another flotation column provided with two diametrically extending baffle plates.

Reference is now made to FIGS. 2 to 5 to describe one embodiment of the flotation column 12 in greater detail. Parts which correspond with parts already described with reference to FIG. 1 are given the same reference numerals. Thus, the column 12 has feed inlets 14, an internal launder 18, an oil outlet 20, a treated water outlet 22, an inspection opening 21, a drain 23 and a gas header pipe 38 which surrounds the column 12, as shown in FIG. 5 with reference to the two baffle plate column 40 shown in that Figure.

The column 12 is the cell in which flotation takes place and, as shown, it comprises an elongate vertical container.

Depending on the application, it may have a diameter that ranges from only a few inches, in a column for testing purposes, to a diameter of up to 15 feet (4.5 meters), or more, in an industrial installation. Although the column 12 is shown to be circular, it may also be rectangular with sizes up to 13 feet by 16 feet (4 meters by 5 meters) or larger. The height of the column 12 may range from a few feet for test columns, up to about 40 feet (12 meters), or greater, in industrial applications.

In applications where the column 12 is over 4 feet (1.2 meters) in diameter, it is provided with one or more internal baffles to reduce mixing and short circuiting in the column. The objective is to reduce the column 12 into a series of smaller diameter columns, all within the main column.

Another objective is to have a height to diameter ratio of about 10:1. The smaller diameter internal baffled sections and the 10:1 height to diameter ratio counteract short circuiting of the water being treated in the column.

The column 12 has a diameter of about 6½ feet (2 meters), and is provided with four radially extending baffle plates 24.1, 24.2, 24.3, 24.4, the adjacent baffles being at right angles to each other.

The baffle plates 24.1, 24.2, 24.3, 24.4 extend up in the column 12 to the bottom of the launder 18. The plates 24.1 and 24.3 extend down to the broken line indicated at 46 in FIG. 2 and the plates 24.2 and 24.4 extend down to the level indicated at 48 in FIG. 2.

A feed inlet 14 is provided for each of the four quadrants in the column 12, defined by the baffles 24.1, 24.2, 24.3, 24.4, as shown in FIG. 3.

The column 40 shown in FIG. 5, is similar to the column 12 but it is of a smaller diameter and it has two diametrically extending baffle plates 50.1 and 50.2, dividing the column in two semi-circular sections. A feed inlet (not shown) is provided for each semi-circular section.

In respect of both of the columns 12 and 40, the sparger tubes 17, which are of a porous metal material in the present example, are arranged in an array as shown in FIG. 5 to provide an even distribution of gas bubbles over the entire cross-section of the column 12, 40. The ends of the tubes 17 are closed and are supported by a pair of diametrically extending support plates 52 attached to the opposite sides of the baffles 24.2, 50.2 and 24.4, 50.1.

The opposite ends of the tubes 17 are open and are each connected through a connector 54 and a hose 56 through a further connector 58 to a respective connection opening 60 in the header pipe 38, as shown in FIGS. 4 and 5. Only two of the connectors 58 are shown in FIG. 5 and the tubes 17 are not shown connected to the connection openings 60 in this Figure. The header pipe 38 is attached to the column 12, 40 by means of support members 62. The gas connection from the gas flow control loop 15 to the header pipe 38 is shown at 64 in FIG. 2.

The sparger tubes 17 in the present example are of a porous medium, such as the porous metal spargers provided by Nemet-Krebsoge of Terryville, Conn. The porous medium of the tubes 17 is selected so that when connected to the gas supply from the header tube 38, the tubes 17 produce a large amount of bubbles of substantially uniform size of about 0.1 mm to about 5 mm in diameter. It has been found that using a narrow distribution of bubbles provides good results for good oil removal.

Figure 6:
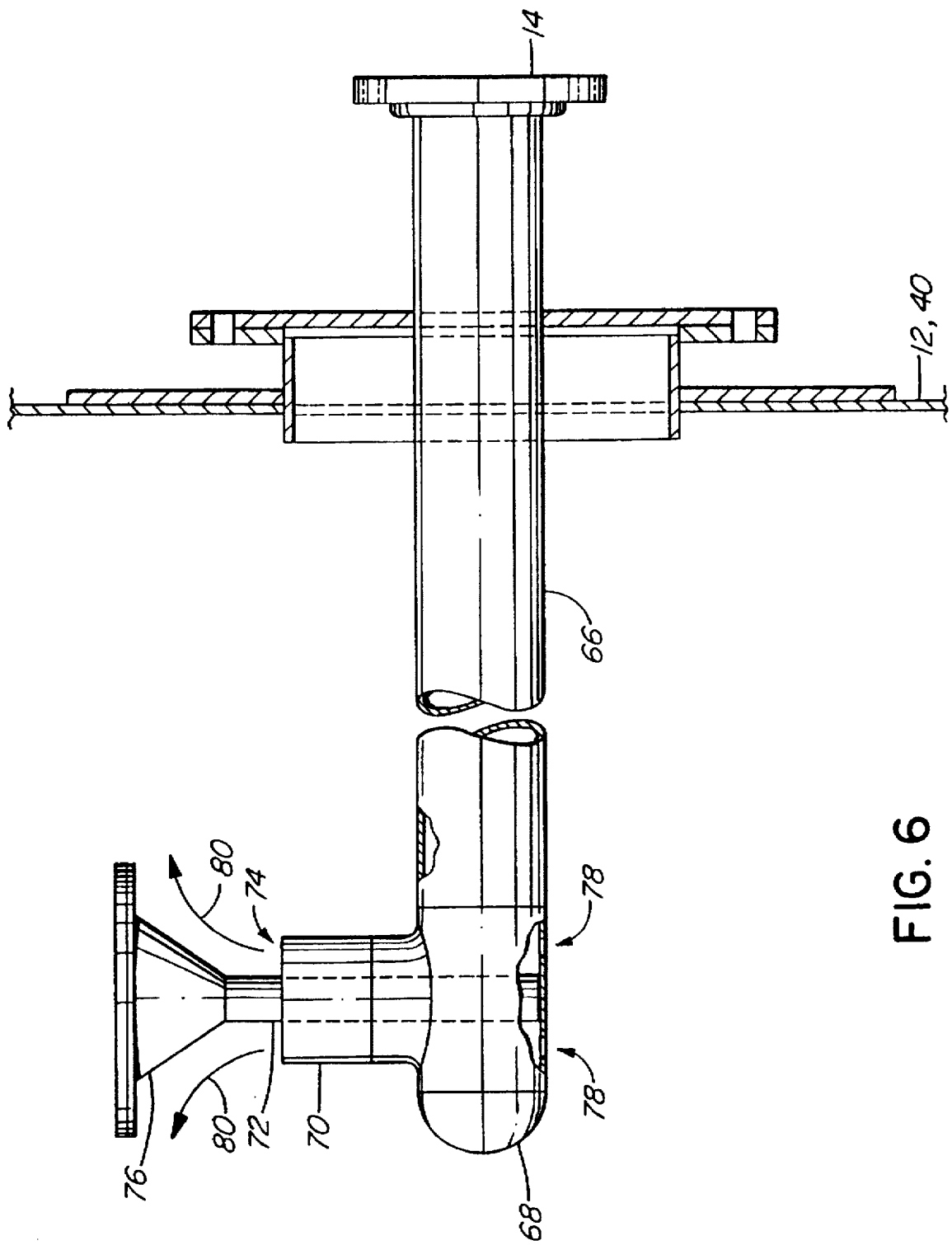
FIG. 6 is a partial side view showing a feed inlet which is suitable for use in the columns of FIGS. 2 and 5.

As shown in FIG. 6, each feed inlet 14 comprises an inlet pipe 66 which terminates in a rounded dead end and having an upwardly extending pipe section 70. An inner pipe section 72 is located inside the section 70 so that an annular space 74 is defined between the sections 70 and 72. The lower end of the inner section 72 extends all the way down to the inner side of the inlet pipe 66. A conical deflector plate 76 is provided at the upper end of the inner section 72. For convenience, a pair of drain openings 78 is provided in the inlet pipe 66.

The positioning and length of the inlet pipe 66 is such that the inner section 72 is located substantially centrally in a cross-section of the area being served by the inlet 14. For example, in column 12, the section 72 will be located centrally of each quadrant and in the column 40, it will be located centrally of each semi-circular area.

In operation, oily water to be treated will be pumped into the inlet pipe 66 and will flow upwardly through the annular space 74 and be deflected in all directions radially of the section 72 to provide a distribution of feed evenly over the area being served by the inlet 14, as indicated by the arrows 80 in FIG. 6.

The operation of the flotation system 10 as a whole will now be described below.

The oil contaminated water to be treated is introduced through the feed inlets 14 in the upper part of the column 12, 40, while treated water exits through the outlet 22 at the bottom of the column 12, 40, thus creating a flow of the water being treated from the top to the bottom of the column 12, 40.

The gas bubbles generated by the sparging system 16 through the porous tubes 17 in the lower part of the column 12, 40 rise up and flow countercurrent fashion through the water. The oil in the water attaches itself to the rising gas bubbles. The gas is released at the top of the column through a vent 82 or is recycled, leaving the oil as a layer on top of the water. The upper level of the oil layer is maintained at a level below the launder 18, as shown by the broken line 28 in FIG. 2. The oil layer is indicated by reference numeral 31.

The system 10 is operated with a water flow velocity in the range of about 0.2 to about 1 inch/second (0.5 to 4 cm/second), with a retention time of about 1 to 10 minutes in the column 12, 40, and an upward flow velocity of gas bubbles of about 0.04 to about 1.6 inches/second (0.1 to 4 cm/second). A gas bubble size in the range of about 0.004 to about 0.2 inches (0.1 to 5 mm) diameter, is desirable. The velocities referred to are superficial velocities, i.e. volume flow per second divided by the cross section of the column to give the flow rates or velocities in inch/second. For example, the gas flow in "standard cubic feet per minute" is converted to superficial velocity by dividing by the cross-sectional area of the column.

Normally, the system 10 is operated with the oil level in the column 12, 40 at the line 28. This set point level is a preselected parameter.

The outlet 22 is provided with a control valve 32 which controls the outflow of water from the column 12, 40.

The system 10 further includes a level sensor 30 and an electronic controller 34. The level sensor 30 provides a level signal to the controller 34. The controller 34 compares the level signal to the set point level and adjusts the position of the level control valve 32, i.e. the valve 32 is opened slightly if the level is above the set point level 28 or closed slightly if below the set point level 28. Thus, for example, if the valve 32 was opened slightly to lower the level, the controller 34 will close the valve 32 slightly to keep the level at the set point 28.

The system 10 further includes an operator adjustable timer 36. Adjustment of the timer 36 is dependent on the amount of oil in the water. If there is a large amount of oil present, the timer 36 will be set for a relatively short time, say about one hour. If there is a smaller amount of oil present, then the timer 36 will be set for a longer period of time. During the time periods measured by the timer 36, the level control cycle, as described above, is in operation. However, at the end of each time period measured by the timer 36, an oil dumping operation is initiated. During this operation, the level control valve 32 is closed. As a result, the level in the column 12, 40 rises and, along with it, the level of the oil layer 31, until the oil starts to overflow into the annular launder 18 at the top of the column 12, 40. When this happens, the level sensor 30 detects the high level and sends a corresponding signal to the controller 34. The controller 34 then terminates the oil dumping operation by opening the valve 32 to bring the level back to the set point 28 and maintains this level during the level control cycle, as described above. The oil dump cycle may, for example, be timed to occur when the oil layer on the water is about 6 inches (15 cm) thick.

Thus, the system 10 will go through a series of oil level control cycles at which the oil level is maintained at the set point 28, which cycles are interrupted by intermittent oil dumping cycles to cause overflow of the oil into the launder 18. The intermittent dumping of the oil as opposed to continuous overflow of the oil is important because it allows the oil layer to settle into a discrete layer above the water in the column. Thus, the oil product which is being dumped contains much less water than the oily product produced by the conventional methods.

The oil exits the launder 18 through the oil outlet 20 to an oil holding tank. The launder 18 is located inside the column 12, 40. The internal launder 18 is important to reduce fabrication costs and to render gas containment easier. Thus, whereas in conventional systems the gas is allowed to escape to atmosphere, the gas used for flotation in the present apparatus can be contained and recycled, if required.

While the above example refers to the removal of oil from water, it will be appreciated that it may also be used for the removal of solids, such as precipitates, disposed in the water, as well as other organic liquids, apart from oil.

According to a further embodiment of the invention, the column 12, 40 may be operated under pressure. This has the advantage of avoiding a pressure let down stage which tends to shear the micron-size oil droplets into even smaller sizes, which are more difficult to recover.

The system 10 may also be used to re-treat the oily water produced by conventional mechanical oil flotation equipment to produce a water stream with less than 100 ppm oil and an essentially 100 per cent pure oil product.

In the embodiment described above, the method has been described as involving countercurrent flow, i.e., the water to be treated flows from above to below, against the upward flow of the gas bubbles. However, the process can also be operated with the water being treated flowing upwardly with the rising gas bubbles, albeit at different rates. In this method of operation, it is possible to operate with smaller gas bubbles and longer retention times, e.g., for the removal of finely precipitated solids, such as FeS, or where the oil droplets dispersed in the water are very small, e.g., less than 15 microns.

In the countercurrent system, if the bubble size is too small or retention time too long, the velocity of the rising gas bubbles would be too slow, resulting in excess gas hold-up and unstable column operation. In the co-current method of operation, this problem does not arise, and the use of smaller air bubbles results in a much greater contact surface area enhancing the removal of oil and solids.

In the co-current method of operation, the gas bubbles can be generated by saturating a stream of water at a higher pressure, say 50 psig, with the flotation gas and then introducing the water into the flotation column which is at a lower pressure, say 10 to 15 psig. As a result of the pressure drop, the gas comes out of solution in the form of very small gas bubbles. Surfactants or flocculants can also be used to reduce bubble size.

In the co-current operating mode, the gas velocity may be in the range of about 0.025 to about 2.5 inches/sec (0.01 to 1 cm/sec) and the water flow velocity from about 0.15 to about 2.5 inches/sec (0.05 to 1 cm/sec). The retention time may be in the range of 10 to 30 minutes or more, with a gas bubble size of less than 0.005 inches (0.1 mm). The ratio of aqueous flow rate to gas flow rate may be about 10 to 30, or more.

To further assist the removal of finely divided solids, flocculation agents, may be introduced to produce larger particle sizes, or chemicals may be used to enhance flotation.

Figure 7:
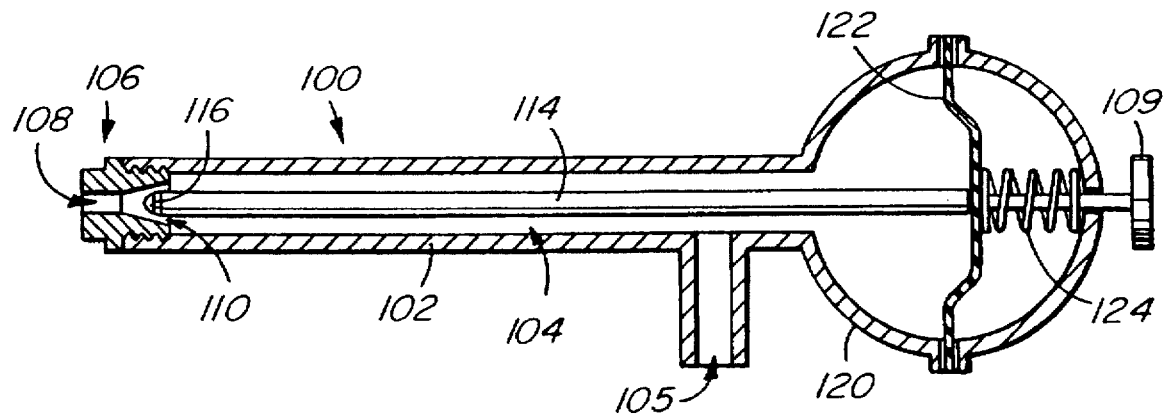
FIG. 7 is a schematical side view showing a longitudinal section through a sparger according to another embodiment of the invention.
Figure 8:
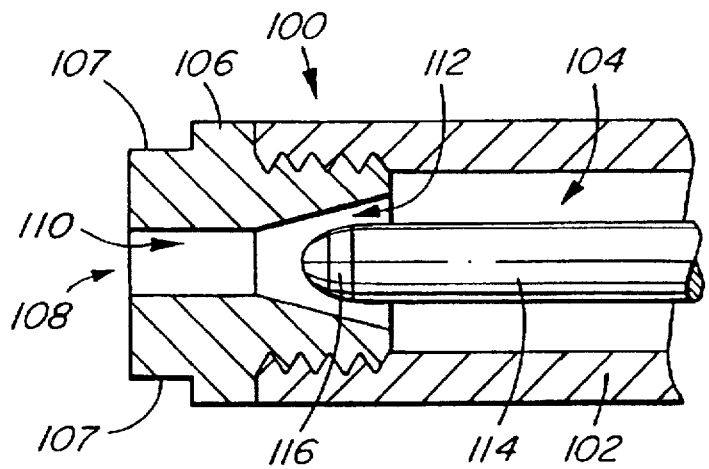
FIG. 8 is a partial view showing an outlet end of the sparger of FIG. 7 in greater details

Referring now to FIGS. 7 and 8, a sparger 100 according to another embodiment of the invention is shown. The sparger 100 comprises a body member 102 having a gas flow passage 104 therein. The gas flow passage 104 is in communication with a gas inlet 105. The body member 102 has an outlet portion 106 provided with a gas outlet 108. The outlet portion 106 is provided with an internal bore 110 therein, which bore has opposite sides which converge in the direction of the outlet 108 to form a tapered region 112 (FIG. 8). An elongate valve member 114 is associated with the tapered region 112 and is movable longitudinally with respect to the tapered region 112. The valve member 114 has a tapered head 116 which is located in the tapered region 112 for controlling the flow of gas through the outlet 108. For this purpose, an adjustment handle 109, which is operatively connected to the valve member 114, is provided for adjusting the position of the tapered head 116 relative to the tapered region 112. As can be seen, the bore 110 has a substantially constant diameter in the area between the tapered region 112 and the outlet 108.

The outlet portion 106 is removably attached to the body member 102 by means of a screw thread so that it can be removed for cleaning or if replacement is required due to wear of the inner surfaces. For this purpose, it is provided with mill flats 107 for receiving a wrench.

At its rear end, the sparger 100 is provided with a chamber 120 housing a rubber diaphragm 122 which is operative on the valve member 114 through the bias of a spring 124.

Under normal operation, the diaphragm 122 is forced rearwardly against the bias of the spring 124 and the valve member 114 is maintained in its open position as set by the adjustment handle 109. This is due to the gas pressure in the gas flow passage 104 acting on the diaphragm 122. Should the gas flow be interrupted and the gas pressure in the gas flow passage 104 drops, the spring 124 will act on the diaphragm 122 to close the sparger outlet 108 by moving the valve member 114 forward. This counteracts tramp solids flowing into the sparger 100 which could cause blockage.

Figure 9:
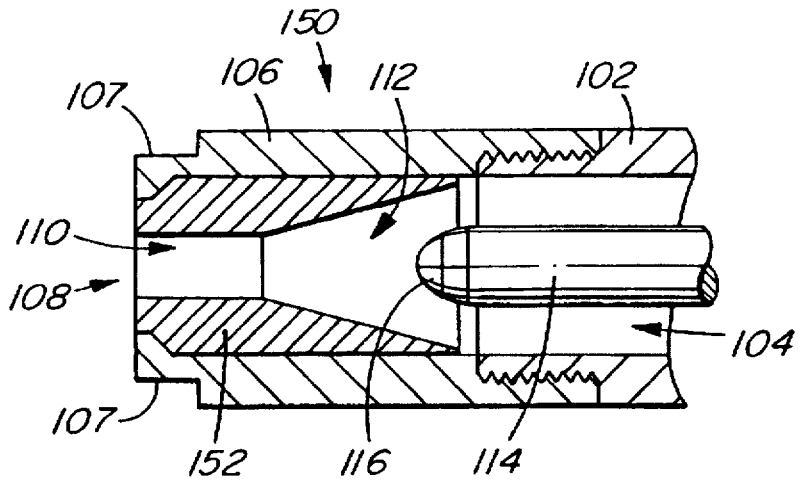
FIG. 9 is a partial view showing an outlet end of a sparger tube according to another embodiment of the invention.

Referring to FIG. 9, a sparger 150 according to another embodiment of the invention is shown. The sparger 150 is basically similar to the sparger 100 and the same reference numerals are used to identify the corresponding parts. In the sparger 150, the removable outlet portion 106 has a replaceable insert 152 which has the internal bore 110 with the tapered region 112 therein. The insert 152 is of a wear-resistant material, such as a ceramic, and it forms a wear-resistant layer inside the outlet portion 106. The insert 152 can be replaced when it becomes worn so that the entire outlet portion 106 need not be replaced.

Figure 10:
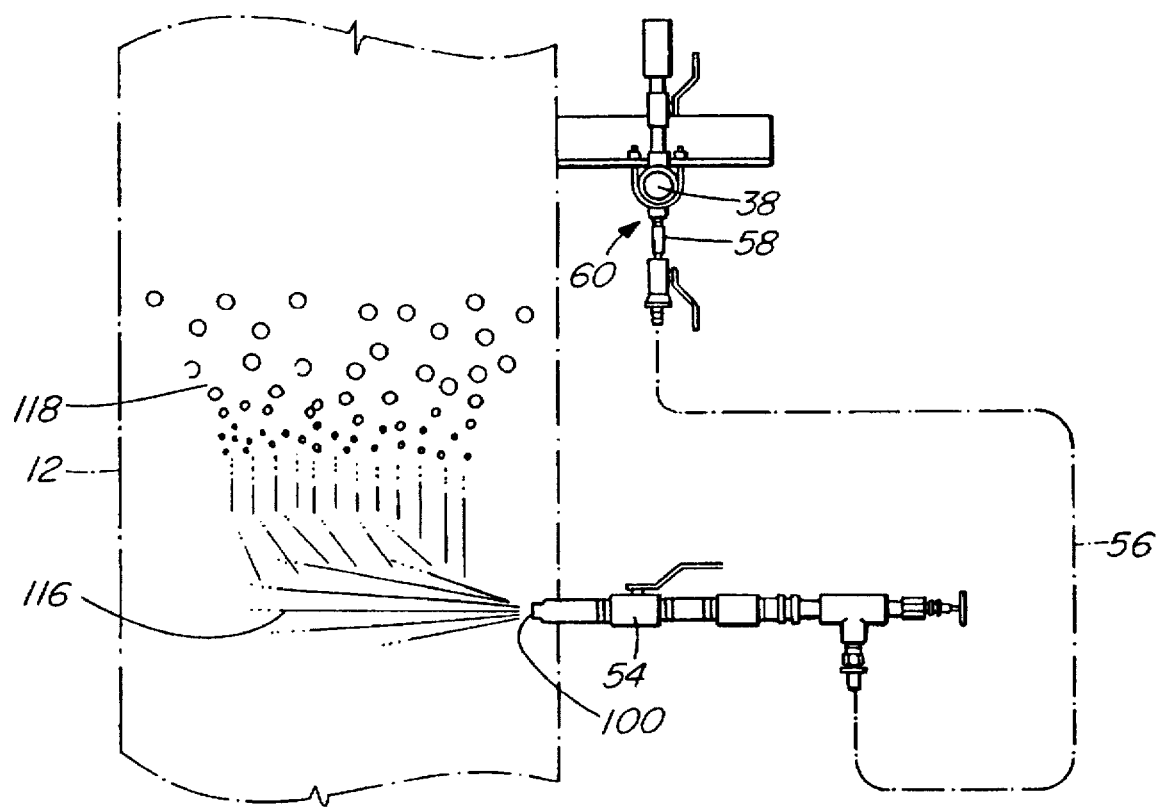
FIG. 10 is a side view of an installation including the sparger of FIG. 7 to illustrate the operation of the sparger.

The operation of the spargers 100 and 150 is shown in FIG. 10. Unlike the porous sparger tubes 17, the sparger 100, 150 does not extend significantly into the column 12. It protrudes from one side of the column 12 and ejects a spray of gas 116 into the column 12 as shown. This produces an upward flow of gas bubbles 118 in the column 12.

Whereas the specific embodiments described above refer to the removal of oil from water, it will be appreciated that the method and apparatus can also be used for the removal of other organic liquids from an aqueous medium.

While only preferred embodiments of the invention have been described herein in detail, the invention is not limited thereby and modifications can be made within the scope of the attached claims.

What is claimed is:

1. A sparger for producing gas bubbles in a liquid, comprising a body member having a gas inlet and an outlet portion provided with a gas outlet said gas inlet being connected to a source of gas and said gas outlet being in communication with a liquid medium into which gas bubbles are to be introduced, said outlet portion having an internal bore which is in communication with said gas inlet and gas outlet, said bore having opposite sides which converge in the direction of said outlet to form a tapered region in said bore, wherein said bore has a substantially constant diameter along at least a part of its length in an area between said tapered region and said outlet, said sparger further comprising a valve member which is movable into said tapered region towards the outlet for controlling the flow of gas through said gas outlet and into said liquid medium.

2. The sparger according to claim 1, wherein said valve member has a tapered head portion which is located in said tapered region.

3. The sparger according to claim 2, wherein said outlet portion is detachable from the rest of said body member.

4. The sparger according to claim 1, wherein said valve member is operatively connected to biasing means responsive to gas pressure in said body member for closing said gas outlet when the gas pressure drops below a predetermined value.

5. The sparger according to claim 4, wherein said biasing means comprises a membrane on said valve member which is exposed to gas pressure in the body member for maintaining the valve member in an open position and a spring biasing said valve member to a closed position for closing said valve member when the gas pressure drops below said predetermined value.

* * * * *